US009485242B2

(12) United States Patent
Yang et al.

(10) Patent No.: US 9,485,242 B2
(45) Date of Patent: Nov. 1, 2016

(54) ENDPOINT SECURITY SCREENING

(71) Applicant: LinkedIn Corporation, Mountain View, CA (US)

(72) Inventors: Lin Yang, Moutain View, CA (US); Lei Ni, Mountain View, CA (US); Qi Liu, Mountain View, CA (US); Rahul D. Sule, Mountain View, CA (US); Annabel Liu, Mountain View, CA (US); Sridevi Kulasekaran, Mountain View, CA (US)

(73) Assignee: LinkedIn Corporation, Mountain View, CA (US)

( * ) Notice: Subject to any disclaimer, the term of this patent is extended or adjusted under 35 U.S.C. 154(b) by 26 days.

(21) Appl. No.: 14/599,311

(22) Filed: Jan. 16, 2015

(65) Prior Publication Data
US 2016/0212111 A1     Jul. 21, 2016

(51) Int. Cl.
H04L 29/06      (2006.01)

(52) U.S. Cl.
CPC .............. H04L 63/08 (2013.01); H04L 63/10 (2013.01)

(58) Field of Classification Search
CPC .................... G06F 21/10; G06F 2221/2141
See application file for complete search history.

(56) References Cited

U.S. PATENT DOCUMENTS

| 2003/0225834 | A1* | 12/2003 | Lee ....................... G06Q 10/107 709/204 |
| 2006/0048214 | A1* | 3/2006 | Pennington ........... H04L 63/168 726/5 |
| 2007/0055775 | A1* | 3/2007 | Chia ................. G06F 17/30867 709/225 |
| 2008/0052359 | A1* | 2/2008 | Golan .................. G06Q 10/107 709/206 |

* cited by examiner

*Primary Examiner* — Jason K Gee
(74) *Attorney, Agent, or Firm* — Park, Vaughan, Fleming & Dowler LLP

(57) ABSTRACT

In order to prevent unauthorized access to information, a system may analyze and may selectively store the information provided based on requests from users that are not unauthorized to access the information. In particular, the system may receive a request for information associated with a document (such as a web page) from an authorized user, either in real-time (i.e., during live or online operation of the system) or offline (in which case the system may operate as a proxy for a live feed of requests). In response, the system may provide or replay the request, but may include the credentials of an unauthorized user. Then, the system may analyze the response to the request to determine if the response is substantive (i.e., includes information). If yes, the system may store the response for use in subsequent analysis and to guide remedial action.

20 Claims, 5 Drawing Sheets

ENDPOINT SECURITY SCREENING

BACKGROUND

1. Field

The described embodiments relate to techniques for performing security screening. More specifically, described embodiments relate to techniques for repeating a previous request for information, but using a credential for an unauthorized user to assess the security of the information.

2. Related Art

The Internet is a popular network for providing access to content. For example, numerous users can access content from a server via the Internet. In response to a request for a particular web page or Uniform Resource Locator, the server may provide information specifying the requested web page to a client device (such as a user's computer or cellular telephone). Then, a web browser in the client device may display the web page based on the received information.

However, the convenience offered by ready access to information via the Internet also poses some security problems. For example, not all requests for information are benign. Unfortunately, malicious individuals often request information or access information that they are not supposed to access, or a request may be misconfigured or misdirected. The resulting security breaches can cause significant harm, ranging from embarrassing releases of information, to identity theft and even to destruction of property. Consequently, the security of information accessible via public networks such as the Internet is a pressing concern.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to prevent unauthorized access to information, a system may analyze and may selectively store information provided in response to requests from users that are not unauthorized to access the information. In particular, the system may receive a request for information associated with a document (such as a web page) from an authorized user, either in real-time (i.e., during live or online operation of the system) or offline (in which case the system may operate as a proxy for a live feed of requests). In response, the system may provide or replay the request, but may include the credentials of an unauthorized user. Then, the system may analyze the response to the request to determine if the response includes information. If yes, the system may store the response for use in subsequent analysis and to guide remedial action.

By performing the security screening, this security technique may reduce the likelihood of unauthorized access to information associated with requested documents (such as web pages). Consequently, this may reduce the harm and the costs associated with security breaches.

In the discussion that follows, an individual or a user may include a person (for example, an existing user of the social network or a new user of the social network). Also, or instead, the security technique may be used by an organization, a business, and/or a government agency. Furthermore, a 'business' should be understood to include for-profit corporations, non-profit corporations, groups (or cohorts) of individuals, sole proprietorships, government agencies, partnerships, etc.

Figure 1:
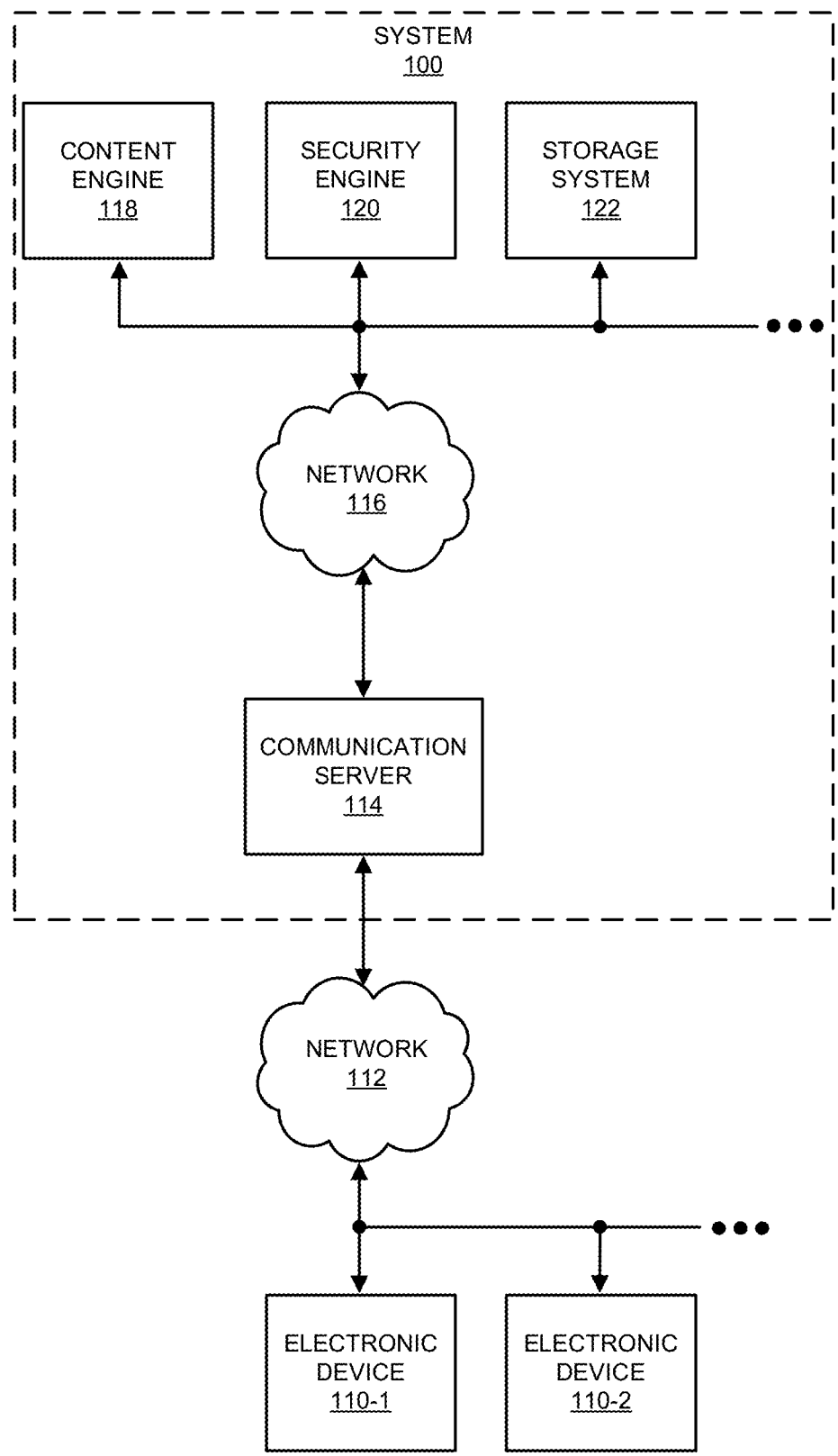
FIG. 1 is a block diagram illustrating a system used to provide access to information associated with documents in accordance with an embodiment of the present disclosure.

We now describe embodiments of the system and its use. FIG. 1 presents a block diagram illustrating a system 100 that performs the security technique. In this system, users of electronic devices 110 may use a software product, such as instances of a software application that is resident on and that executes on electronic devices 110. In some implementations, the users may interact with one or more web pages that are provided by communication server 114 via network 112, and which are rendered by web browsers on electronic devices 110. For example, at least a portion of the software application executing on electronic devices 110 may be an application tool that is embedded in one of the web pages, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Using one of electronic devices 110 (such as electronic device 110-1) as an illustrative example, a user of electronic device 110-1 may use the software application to interact with other users in a social network (and, more generally, a network of users), such as a professional social network of individuals and organizations, which facilitates interactions among the users. Note that each of the users of the software application may have an associated user profile that includes personal and professional characteristics and experiences, which are sometimes collectively referred to as 'attributes' or 'characteristics.'

For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections.

As the user of electronic device 110-1 interacts with other users in the social network, content engine 118 may provide, via network 116, different web pages to electronic device 110-1 (and, thus, the user). For example, content engine 118 for the social network may access stored information corresponding to the web pages in a computer-readable memory (such as storage system 122 that may encompass multiple devices, i.e., a large-scale storage system), and this information may be provided to electronic device 110-1. In particular, the user's interaction with the web pages may correspond to a series of requests (e.g., by clicking or activating on a hyperlink), and in response content engine 118 may provide the requested web page(s) (or, more generally, documents) and the associated information. Note that the an endpoint may be a location (e.g., a uniform resource locator) at which a service or application can be accessed, such as different landing pages, service points, etc. Each different endpoint may serve associated content. However, some endpoints may return null information. Thus, in the present discussion, an endpoint is defined as a termination point of communication connections.

In principle, the user is authorized to access the requested information for the documents (and, thus, is sometimes referred to as an 'authorized user'). This authorization may be included or associated with the user profile of the user, and may be confirmed by content engine 118 prior to providing the information and/or the documents (such as web pages). For example, the requests from electronic device 110-1 may include a cookie with a credential or a token for the authorized user. In response, content engine 118 may compare this credential to authorizations or privileges associated with the user profile or account of the authorized user. In practice, there may be errors in this process. In particular, there may be errors in the user profiles and/or in the security logic implemented by content engine 118. This may allow other (unauthorized) users to access information that they are not supposed to receive.

In order to address this problem, security engine 120 may receive requests made by authorized users. This may be in real-time, as the requests are received by content engine 118, and the information is provided to electronic devices 110 in responses. Alternatively or additionally, content engine 118 may be offline, i.e., may not currently be responding to requests received via networks 112 and 116. In these embodiments, security engine 120 may be a proxy for content engine 118. In particular, security engine 120 may access stored requests from one or more users of electronic devices 110 who are, in general, authorized to receive the information associated with the endpoints. These requests may be stored in a computer-readable memory (such as storage system 122).

In some embodiments, security engine 120 optional determines if responses to these requests include 'substantive' information. For example, security engine 200 may determine if a response includes: information about users of the social network, information that only a subset of users are allowed to access, is other than null (i.e., any content), etc.

Then, security engine 120 may provide these requests to content engine 118 with credentials for unauthorized users who lack authorization to access the information associated with the requests (e.g., actual or dummy users who have no authorization or, at best, only partial authorization). For example, security engine 120 may provide a request to content engine 118 with a credential (such as a token or a cookie) for an unauthorized user who lacks authorization to access the information (or an endpoint) associated with a particular web page. Note that the credential for the unauthorized user may be predetermined. Alternatively or additionally, the unauthorized user may include a fictitious user specified by a random number. Moreover, the random number may be dynamically generated or selected by security engine 120.

Subsequently, security engine 120 may receive from content engine 118 a response to the request from the unauthorized user. Security engine 120 may determine if the response is 'other than null,' i.e., includes: information, empty values (as a string, number or other types), a null value, or 'N/A.' If the response is other than null, security engine 120 may selectively store or log the response in storage system 122 (or the response body to the replay request). In addition, in this case security engine 120 may store additional information specifying: at least a portion or a subset of the document (such as the web page) associated with the information, the request body, the authorized user, the content of a previous response to the request from the authorized user (such as the response body), and/or the replay-request body.

After storing the response to the request from the unauthorized user, security engine 120 may analyze the response to the request from the unauthorized user based on a target pattern, and then may perform remedial action based on the analysis. For example, the analysis may determine whether the content of the response is, in fact, allowed, potentially harmful, or indicates a flaw or failure in the security of the requested document. In some embodiments, the target pattern may be associated with a security issue, and the analysis includes applying one or more logical tests (or performing filtering) to determine if the content in the response matches the target pattern. Furthermore, if a security issue or a problem is identified based on the stored response to the request from the unauthorized user, privileges in system 100 may be modified so that the information or content in the response is no longer provided in response to future requests from unauthorized users.

In these ways, the security technique may, in an offline or an online system, dynamically perform a security screening to confirm that unauthorized users are not able to receive or access information associated with documents (such as web pages) that the unauthorized users are not authorized to access. This security technique may allow security issues to be identified and remedial action to be taken to improve the security of system 100.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

Figure 2:
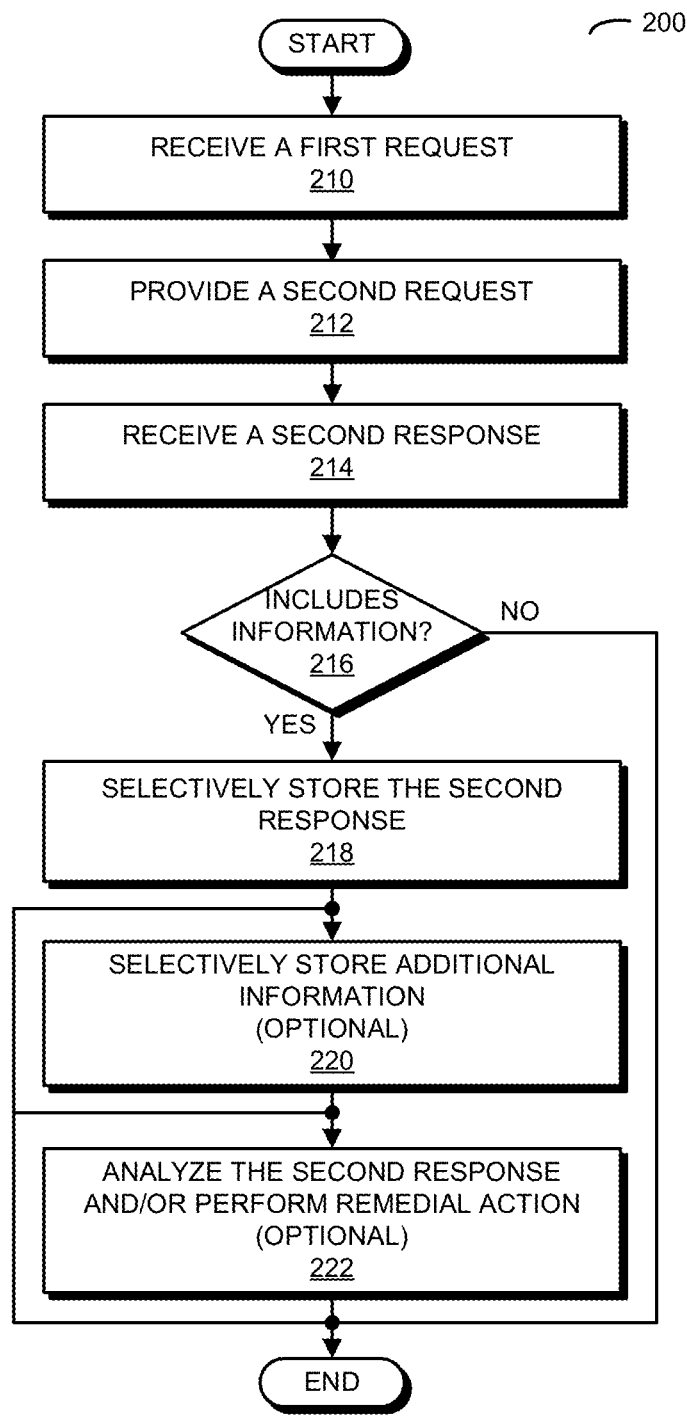
FIG. 2 is a flow chart illustrating a method for performing security screening in accordance with an embodiment of the present disclosure.

We now describe embodiments of the security technique. FIG. 2 presents a flow chart illustrating a method 200 for performing a security screen, which may be performed by a computer system (such as system 100 in FIG. 1 or computer system 500 in FIG. 5). During operation, the computer system receives a first request (operation 210) for information associated with a document (such as a web page), where the first request is associated with an authorized user authorized to access the information associated with the document. For example, the computer system may receive the request from the authorized user (or an electronic device associated with the authorized user). Alternatively or additionally, the computer system may access the previously stored request from storage system 122 (FIG. 1).

Then, the computer system provides a second request (operation 212) for the information associated with the document, where the second request includes credentials for an unauthorized user who lacks authorization to access the information associated with the document. For example, the second request may be provided to content engine 118 (FIG. 1).

Moreover, the computer system receives a second response (operation 214) to the second request. In particular, the second response may be received from content engine 118 (FIG. 1).

Next, the computer system determines if the second response includes information (operation 216). Furthermore, the computer system selectively stores the second response (operation 218) when the determination indicates the second response includes information. For example, the second response may be stored in storage system 122 (FIG. 1). Otherwise, method 200 may end.

In some embodiments, the computer system optionally selectively stores, when the determination indicates the second response includes information, additional information (operation 220) specifying the document, the first user, and/or a first response to the first request. Alternatively or additionally, the computer system may optionally analyze the second response (operation 222) based on a target pattern (such as by comparing the second response to the target pattern and/or the first response), and/or may optionally perform remedial action (operation 222) based on the analysis.

Figure 3:
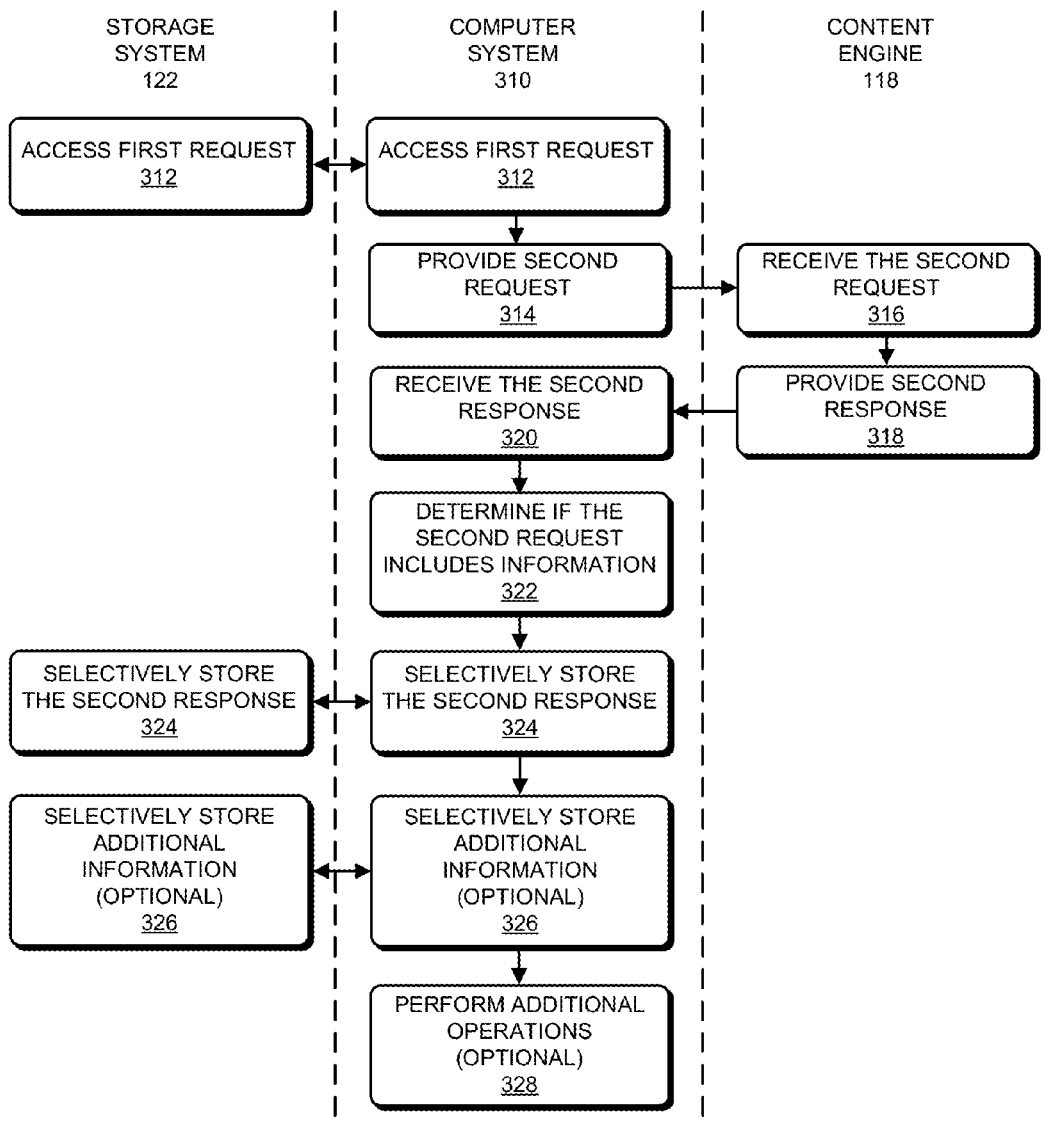
FIG. 3 is a flow chart illustrating communication between the electronic devices of FIG. 1 in accordance with an embodiment of the present disclosure.

In an exemplary embodiment, method 200 is implemented using one or more electronic devices and at least one server (and, more generally, a computer system), which communicate through a network, such as a cellular-telephone network and/or the Internet (e.g., using a client-server architecture). This is illustrated in FIG. 3, which presents a flow chart illustrating method 200. During this method, computer system 310 may access the first request (operation 312) for information from storage system 122. Then, computer system 310 may provide the second request (operation 314) for the information, which is received by content engine 118 (operation 316).

In response, content engine 118 may provide the second response (operation 318). After receiving the second response (operation 320), computer system 310 may determine if the second response includes information (operation 322). If yes, computer system 310 may selectively store the second response (operation 324) in storage system 122. In addition, computer 310 may optionally store the additional information (operation 326) in storage system 122. In some embodiments, computer system 310 optionally performs additional operations (operation 328), such as the analysis of the second response and/or performing the remedial action based on the analysis.

In some embodiments of method 200 (FIGS. 2 and 3), there may be additional or fewer operations. Moreover, the order of the operations may be changed, and/or two or more operations may be combined into a single operation.

In an exemplary embodiment, the security technique is used to discover or identify cross-credential security issues in an automated fashion. In particular, the security technique may repeat or replay previous requests (such as the requests or traffic through targeted endpoints in a web page or website) with different identities to determine if the responses are other than null. These different identities may be for unauthorized users, thereby assessing the security of the system that provides the responses. If a substantive or non-empty response is received, it may be stored to facilitate subsequent analysis and, if needed, remedial action.

In particular, a request from an authorized user may be associated with the user activating a user-interface object (such as a radial button) or a hypertext link in a web page. The computer system may subsequently receive this request and the associated response. Note that the response may be a Hypertext Transfer Protocol (HTTP) response in JavaScript Object Notation (JSON) format. In response, the computer system may parse the response to determine if it includes substantial information, such as a response that includes non-null, non-zero or non-empty data. For example, the response {"result":{"recruiterActivity":null,"activityType":"CUSTOM_FIELD"}}

Includes substantial information, while the response

{ "result":{"recruiterActivity":null,"activityType":null}} does not include substantial information.

If the response includes substantial information, this means that the current credential of the user that is visiting the web page has access to certain data (i.e., the user is an authorized user). When this occurs, the computer system may automatically replace the information in the request cookie with a different credential (and, in particular, with the credential for an unauthorized or invalid user). For example, the computer system may change the JSESSIONID, li_a, in the cookie to values read from input files as a different credential. Then, the computer system may reissue the HTPP request with the different credential. This reissued request may occur in real-time or on the fly, i.e., the computer system may check for cross-credential security issues as requests are received from authorized users. Alternatively, the reissued request may occur offline, i.e., the computer system may check for cross-credential security issues when requests are not currently being received from authorized users. For example, the reissued request may be provided by a test script that is executed when the content engine is not currently providing web pages to authorized users.

Once the reissued response is received, the computer system may examine and parse it. If the response codes are the same, the computer system may further examine the returned JSON to make sure there is no meaningful or substantial information in it. If the response includes substantial information, the computer system may save or log the information in the response (such as 'url/endpoint/response code/response/replayed response,' etc.), as well as the endpoint information, for subsequent inspection and/or analysis. For example, the stored replay response may be analyzed using a rule-based technique. Alternatively or additionally, a security alarm may be asserted or raised because of the (unintended) data-visibility issue.

Note that the security technique may identify cross-credential security issues for services or websites that have different tiers of users with different authorizations or levels of visibility for information.

Figure 4:
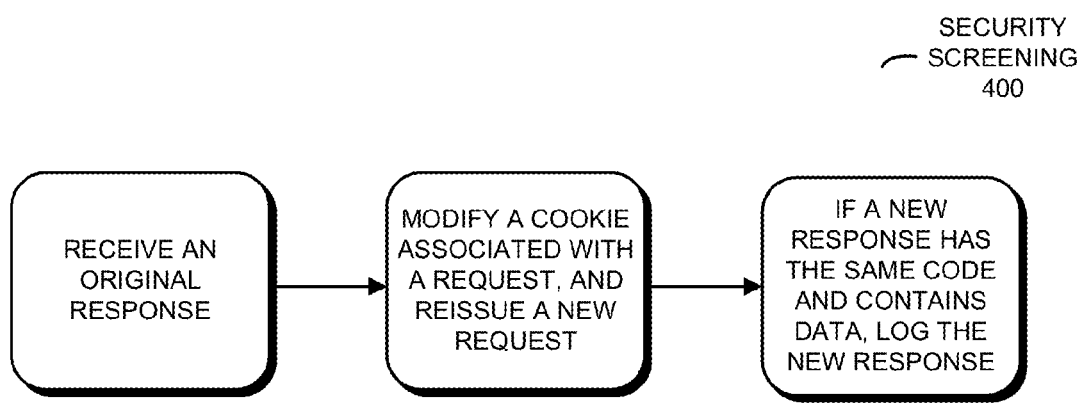
FIG. 4 is a drawing illustrating security screening in accordance with an embodiment of the present disclosure.

The security technique is summarized in FIG. 4, which presents a drawing illustrating security screening 400 in accordance with an embodiment. In particular, the computer system receives an original response (in JSON format with data). Then, the computer system modifies a cookie associated with a request (associated with the original response), and reissues a new request. If a new response has the same response code (as the original response) and contains data, the computer system logs the new response for subsequent analysis.

Figure 5:
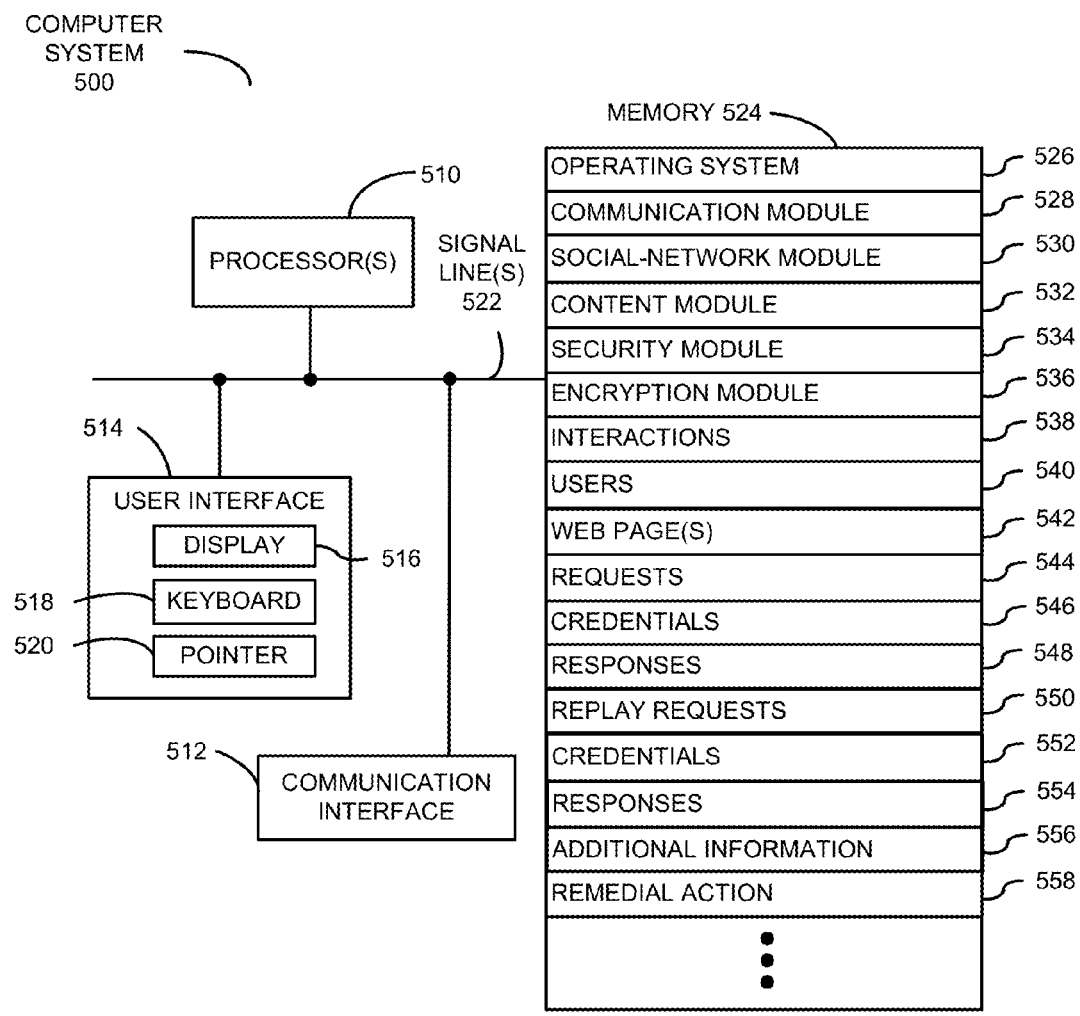
FIG. 5 is a block diagram illustrating a computer system that performs the method of FIGS. 2 and 3 in accordance with an embodiment of the present disclosure.

We now describe embodiments of a computer system for performing the security technique, and its use. FIG. 5 presents a block diagram illustrating a computer system 500 that performs method 200 (FIGS. 2 and 3), such as system 100 in FIG. 1. Computer system 500 includes one or more processing units or processors 510 (which are sometimes referred to as a 'processing module'), a communication interface 512, a user interface 514, memory 524, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516 (such as a touchscreen), a keyboard 518, and/or a pointer 520 (such as a mouse).

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: social-network module 530, content module 532, security module 534, and/or encryption module 536. Note that one or more of these program modules may constitute a computer-program mechanism.

During operation of computer system 500, social-network module 530 facilitates interactions 538 among users 540 via communication module 528 and communication interface 512. The content module 532 may provide, via communication module 528 and communication interface 512, one or more web pages 542. User requests 544 (having credentials 546) associated with these web pages 542 (such as user interactions with a user interface in one or more of web pages 542) may be received by content module 532 via communication module 528 and communication interface 512, and content module 532 may provide related responses 548 to users 540.

Subsequently, security module 534 may substitute credentials 552 (e.g., of unauthorized users) in replay requests 550, which are based on requests 544. These replay requests may be submitted to content module 532. The resulting responses may be analyzed to determine if the content or information in the responses includes information. If yes, security module 534 stores responses 554 and/or additional information 556 for subsequent additional analysis and/or to guide eventual remedial action 558.

Because information in computer system 500 may be sensitive in nature, in some embodiments at least some of the data stored in memory 524 and/or at least some of the data communicated using communication module 528 is encrypted using encryption module 536.

Instructions in the various modules in memory 524 may be implemented in a high-level procedural language, an object-oriented programming language, and/or in an assembly or machine language. Note that the programming language may be compiled or interpreted, e.g., configurable or configured, to be executed by the one or more processors.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 is implemented in one or more application-specific integrated circuits (ASICs) and/or one or more digital signal processors (DSPs).

Computer systems (such as computer system 500), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 500 may include fewer components or additional components. Moreover, two or more components may be combined into a single component, and/or a position of one or more components may be changed. In some embodiments, the functionality of system 100 (FIG. 1) and/or computer system 500 may be implemented more in hardware and less in software, or less in hardware and more in software, as is known in the art.

While a social network has been used as an illustration in the preceding example, more generally the security technique may be used to enhance security in a wide variety of applications or systems. Moreover, the security technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the security technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for performing a security screen to identify website requests requiring remedial action, the method comprising:
    receiving, at a computer, a first request for information associated with a website, wherein the first request is associated with an authorized user authorized to access the information associated with the website;
    receiving, at the computer, a first response to the first request;
    in response to determining that the first response comprises non-empty data, generating, at the computer, a second request for the information associated with the website, wherein the second request includes credentials for an unauthorized user who lacks authorization to access the information associated with the website;
    receiving a second response to the second request; and
    in response to determining that the second response includes non-empty data:
        identifying the second request as requiring remedial action; and
        storing the second response.

2. The method of claim 1, wherein the operations in the method are performed by a proxy that is other than a computer system that provides access to the information associated with the website to users.

3. The method of claim 1, wherein the first request is received from a computer system that provides access to the information associated with the website to users.

4. The method of claim 1, wherein the method further comprises selectively storing, when the determination indicates the second response includes information, additional information specifying the website, the authorized user and the first response to the first request.

5. The method of claim 1, wherein the method further comprises:
    analyzing the second response based on a target pattern; and
    performing remedial action based on the analysis.

6. The method of claim 5, wherein the target pattern is associated with a security issue.

7. The method of claim 5, wherein the analysis includes applying one or more logical tests.

8. The method of claim 1, wherein the website includes a web page located at a Uniform Resource Locator.

9. The method of claim 1, wherein the unauthorized user has partial authorization to access the information associated with the website.

10. The method of claim 1, wherein the unauthorized user is predetermined.

11. The method of claim 1, wherein the unauthorized user includes a fictitious user specified by a random number.

12. An apparatus, comprising:
    one or more processors;
    memory; and
    a program module, wherein the program module is stored in the memory and, during operation of the apparatus, is executed by the one or more processors for performing a security screen to identify website requests requiring remedial action, the program module including:
        instructions for receiving a first request for information associated with a website, wherein the first request is associated with an authorized user authorized to access the information associated with the website;
        instructions for receiving a first response to the first request;
        instructions for generating, in response to determining that the first response comprises non-empty data, a second request for the information associated with the website, wherein the second request includes credentials for an unauthorized user who lacks authorization to access the information associated with the website;
        instructions for receiving a second response to the second request; and
        instructions for, in response to determining that the second response includes non-empty data:
            identifying the second request as requiring remedial action; and
            storing the second response.

13. The apparatus of claim 12, wherein the program module further comprises instructions for selectively storing, when the determination indicates the second response includes information, additional information specifying the website, the authorized user and the first response to the first request.

14. The apparatus of claim 12, wherein the program module further comprises:
    instructions for analyzing the second response based on a target pattern; and
    instructions for performing remedial action based on the analysis.

15. The apparatus of claim 14, wherein the target pattern is associated with a security issue.

16. The apparatus of claim 12, wherein the website includes a web page located at a Uniform Resource Locator.

17. The apparatus of claim 12, wherein the unauthorized user has partial authorization to access the information associated with the website.

18. The apparatus of claim 12, wherein the unauthorized user is predetermined.

19. The apparatus of claim 12, wherein the unauthorized user includes a fictitious user specified by a random number.

20. A system for performing security screening to identify website requests requiring remedial action, comprising:
    a processing module comprising a non-transitory computer-readable medium storing instructions that, when executed, cause the system to:
        receive a first request for information associated with a website, wherein the first request is associated with an authorized user authorized to access the information associated with the website;
        receive a first response to the first request;
        in response to determining that the first response comprises non-empty data, generate a second request for the information associated with the website, wherein the second request includes credentials for an unauthorized user who lacks authorization to access the information associated with the website;
        receive a second response to the second request; and in response to determining that the second response includes non-empty data:
   identify the second request as requiring remedial action; and
   store the second response.

\* \* \* \* \*